United States Patent
Roosli et al.

(10) Patent No.: US 10,072,454 B1
(45) Date of Patent: Sep. 11, 2018

(54) LOCKABLE ENCLOSURE AND SYSTEM AND METHOD FOR OPERATING THE SAME

(71) Applicant: Innovative Hospitality Concepts, Inc., Oakland Park, FL (US)

(72) Inventors: Philipp Roosli, Niantic, CT (US); David Abram, Oakland Park, FL (US); Roger Abram, Oakland Park, FL (US)

(73) Assignee: INNOVATIVE HOSPITALITY CONCEPTS, INC, Oakland Park, FL (US)

( * ) Notice: Subject to any disclaimer, the term of this patent is extended or adjusted under 35 U.S.C. 154(b) by 0 days.

(21) Appl. No.: 15/640,139

(22) Filed: Jun. 30, 2017

(51) Int. Cl.
| | |
|---|---|
| *E05G 1/10* | (2006.01) |
| *E05G 1/02* | (2006.01) |
| *E05G 1/04* | (2006.01) |
| *H04N 5/225* | (2006.01) |
| *H04N 7/18* | (2006.01) |
| *E05B 51/00* | (2006.01) |
| *E05B 39/00* | (2006.01) |
| *E05G 1/00* | (2006.01) |
| *E05G 1/026* | (2006.01) |
| *G03B 29/00* | (2006.01) |

(Continued)

(52) U.S. Cl.
CPC ............ *E05G 1/02* (2013.01); *E05G 1/04* (2013.01); *E05G 1/10* (2013.01); *H04N 5/2253* (2013.01); *H04N 5/2256* (2013.01); *H04N 7/183* (2013.01); *H04N 7/188* (2013.01); *A47B 67/005* (2013.01); *A47B 81/00* (2013.01); *E05B 39/00* (2013.01); *E05B 51/00* (2013.01); *E05G 1/00* (2013.01); *E05G 1/005* (2013.01); *E05G 1/024* (2013.01); *E05G 1/026* (2013.01); *E05G 1/08* (2013.01); *G03B 29/00* (2013.01); *H04N 5/2257* (2013.01)

(58) Field of Classification Search
CPC .. E05G 1/00; E05G 1/04; E05G 1/026; E05G 1/005; E05G 1/024; E05G 1/08; E05G 1/10; H04N 7/188; H04N 5/2257; A47B 2220/0075; A47B 67/005; A47B 81/00; G03B 29/00
See application file for complete search history.

(56) References Cited

U.S. PATENT DOCUMENTS

| | | | |
|---|---|---|---|
| 4,245,902 | A | 1/1981 | Cataldo |
| 8,509,944 | B1 | 8/2013 | Kranyec |

(Continued)

FOREIGN PATENT DOCUMENTS

| | | |
|---|---|---|
| CN | 102926612 A | 2/2013 |
| CN | 204002280 U | 12/2014 |

(Continued)

*Primary Examiner* — Benyam Haile
(74) *Attorney, Agent, or Firm* — Cantor Colburn LLP

(57) ABSTRACT

A system and method for securing personal articles, including a lockable enclosure, an image acquisition device disposed to capture an image of an interior of the lockable enclosure, a storage element configured to store the image, a data transmission element configured to transfer the image to a network, and a controller configured to grant access to the image only upon fulfillment of a predetermined condition, where the image acquisition device, the storage element, the data transmission element, and the controller are disposed in communication with one another and with the network.

18 Claims, 12 Drawing Sheets

(51) Int. Cl.
    *E05G 1/024*     (2006.01)
    *A47B 81/00*     (2006.01)
    *E05G 1/08*      (2006.01)
    *A47B 67/00*     (2006.01)

(56)     References Cited

U.S. PATENT DOCUMENTS

| | | |
|---|---|---|
| 9,317,987 B2 | 4/2016 | Cleveland |
| 2006/0237427 A1 | 10/2006 | Logan |
| 2011/0279225 A1 | 11/2011 | Frontino |
| 2014/0305352 A1* | 10/2014 | Dowling ............ G07C 9/00031 109/38 |
| 2015/0320209 A1 | 11/2015 | Hasselback |
| 2016/0037916 A1 | 2/2016 | Hermann |
| 2016/0053526 A1 | 2/2016 | Dittrich |
| 2016/0080705 A1 | 3/2016 | Jain |
| 2016/0147977 A1 | 5/2016 | Adams |

FOREIGN PATENT DOCUMENTS

| | | |
|---|---|---|
| EP | 2835078 A1 | 2/2015 |
| EP | 2835078 B1 * | 1/2018 |

* cited by examiner 1- 2017/08/11 14:33:12  HANDHELD TOOL CONNECTED
2- 2017/08/11 14:33:18  PASSCODE USER 645232
3- 2017/08/11 14:33:23  REQUESTED STAFF UNLOCK
4- 2017/08/11 14:33:24  IMAGE CAPTURED 5- 2017/08/11 14:33:25  STAFF UNLOCK EXECUTED
6- 2017/08/11 14:33:48  HANDHELD TOOL DISCONNECTED 1- 2017/08/14 21:02:56   GUEST LOCKED SAFE
2- 2017/08/14 21:03:01   IMAGE CAPTURED 3- 2017/08/16 08:54:12   GUEST UNLOCKED SAFE 1- 2017/08/17 07:26:17  GUEST LOCKED SAFE
2- 2017/08/17 13:54:52  IMAGE CAPTURED 3- 2017/55/49 13:55:49  IMAGE SENT TO SERVER
4- 2017/08/17 13:56:17  REMOTE SAFE UNLOCK, USER 869

LOCKABLE ENCLOSURE AND SYSTEM AND METHOD FOR OPERATING THE SAME

TECHNICAL FIELD

The disclosure relates generally to secure enclosures used for storing objects and, more particularly, to safes used in hotel rooms and the like and to a system for efficiently and securely monitoring the contents thereof.

BACKGROUND

Secure enclosures utilized by transient users for temporary or long-term storage of personal articles are found throughout the globe. A typical example is a safe in a hotel room. These are configured to allow a guest who is renting the room to lock personal items within the safe by using a unique personal identification number (PIN), biometrics, RFID, magnetic stripe card, etc., in the case of a safe having an electronic locking system, or by using a key for a safe with a traditional mechanical locking mechanism.

In addition to the electronic locking system, electronic safes usually include additional powered systems such as a user input (e.g., keypad), a visual display, a microprocessor, a motor driver, etc. To simplify installation and to avoid occupying an electrical outlet, these electronic safes are often powered by batteries. Maximizing battery life is critical in order to minimize labor and time associated with the manual replacement of batteries. Energy conservation in these existing electronic systems is paramount.

A challenging situation for the hotel arises when a guest's stay is concluded and they leave the hotel, but the safe is left in the locked condition. Here, the hotel needs to send personnel to open the safe and inspect the contents. This is a sensitive operation as the hotel personnel cannot know if the safe will be empty or if it will be filled with valuable objects. The latter can lead to a potential for theft by the hotel personnel and subsequent inquiries from the departed guest could lead to an awkward claim and counter-claim argument as to what was stored in the safe when it was opened. To address this, existing operational procedures often require a delegation of multiple staff members to be sent to a locked safe in order to have additional witnesses when the safe is opened. This is an expensive and time consuming procedure, and is particularly wasteful if the safe happens to be empty.

In another circumstance, a guest might use the safe during their stay and at a later time claim that its contents were stolen. To resolve this issue with the guest, the hotel typically draws an audit trail report from the electronic safe which provides the timestamped locking and unlocking events effected with the guest PIN code, as well as any staff override operations, and any configuration and maintenance operations. However, the audit trail of existing systems is limited to data regarding the locking and unlocking of the safe and does not provide any information concerning the contents of the safe or even whether anything was actually placed into or removed from the safe compartment during locking and unlocking events. This lack of detail makes the claims of the guest very difficult to support or deny and, in some instances, results in the hotel having to compensate the guest for both real and fake claims.

While prior art implementations of such safes have provided convenience and a degree of security to the user, the above stated limitations make their operation costly to the hotel and allow for abuse by the user. This creates unwanted monetary losses to the hotel that is offering the safes as an amenity to their client. Moreover, minimizing energy consumption of such safes is of critical importance in these systems, and existing attempts at addressing the above limitations have been unable to strike a reasonable balance between operational integrity and energy consumption.

What is needed is a system for securing personal articles, for example within a safe, that provides heightened security and privacy to the user and to their personal articles, and that provides the purveyor of the safe with a convenient and efficient means for determining the content of the safe when necessary, all in a manner which minimizes energy consumption.

BRIEF SUMMARY

A system for securing personal articles is provided herein, the system including a lockable enclosure, an image acquisition device disposed to capture an image of an interior of the lockable enclosure, a storage element configured to store the image, a data transmission element configured to transfer the image to a network, and a controller configured to grant access to the image only upon fulfillment of a predetermined condition, where the image acquisition device, the storage element, the data transmission element, and the controller are disposed in communication with one another and with the network.

Also provided herein is a method for operating a system for securing personal articles, the method including a personal article within an interior of a lockable enclosure, using an input device disposed on the lockable enclosure to send a lock command to a controller, locking the lockable enclosure in response to the lock command, using the input device to send an unlock command to the controller, if the unlock command is valid, capturing an image of the interior of the lockable enclosure, unlocking the lockable enclosure only after said image is captured, securely storing the image at a storage element, and allowing access to the image only upon fulfillment of a predetermined condition.

Additional features are realized through the techniques of the present invention. Other embodiments are described in detail herein and are considered a part of the claimed invention. For a better understanding of the invention with the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
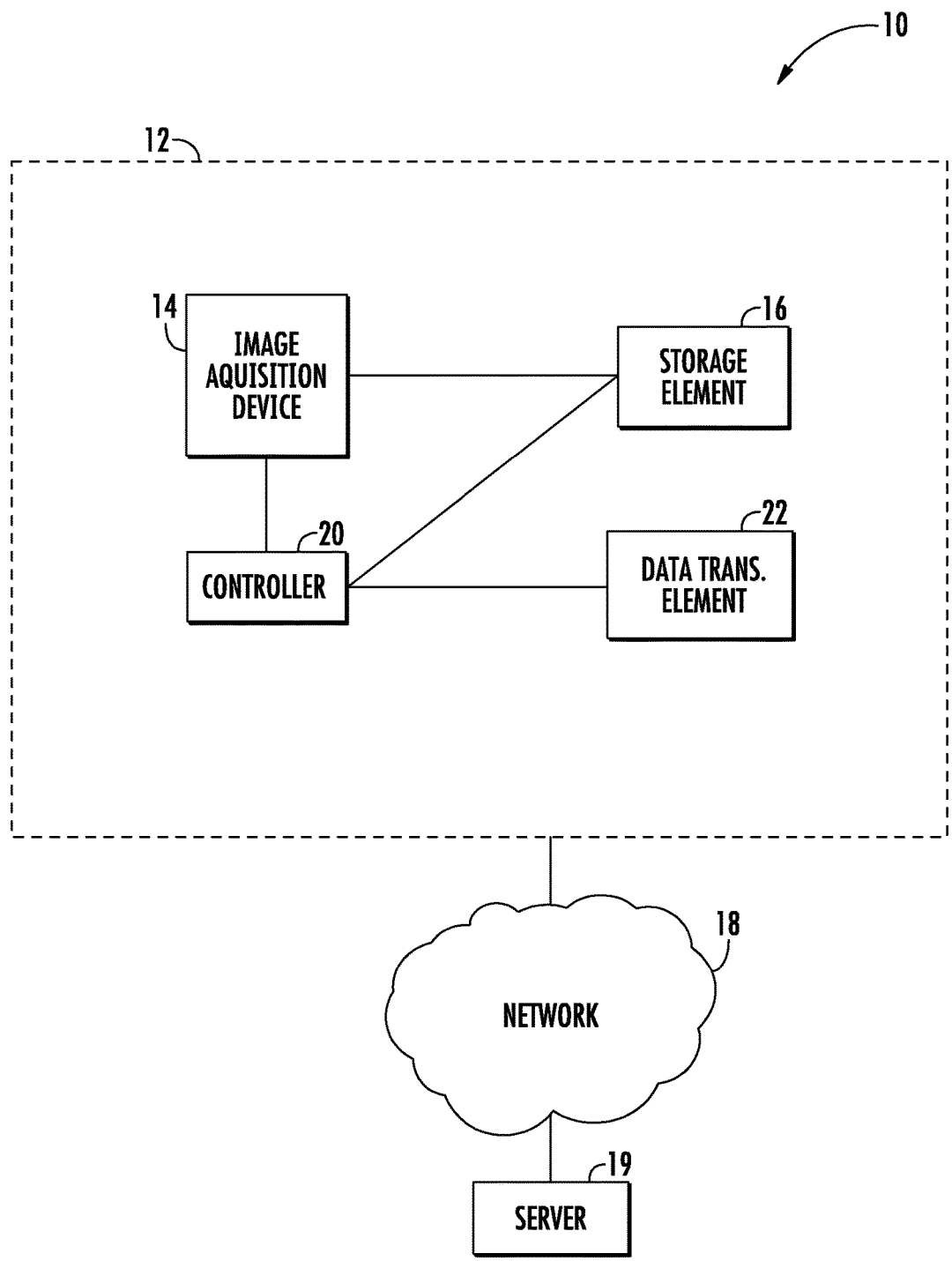
FIG. 1. is a schematic representation of a system according to an embodiment of the invention.
Figure 2:
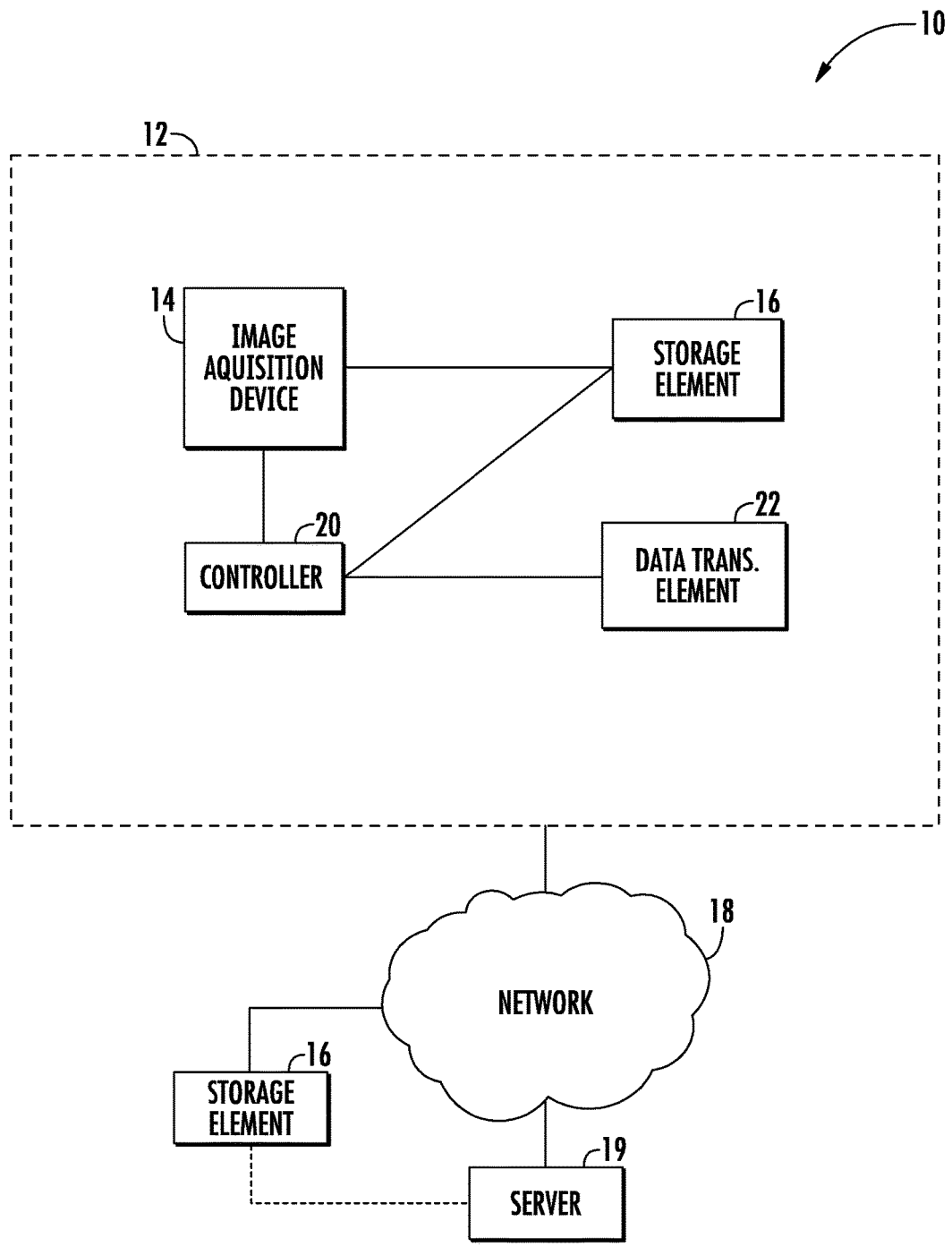
FIG. 2 is a schematic representation of a system according to another embodiment of the invention.

FIG. 1 provides an illustrative schematic representation of a system for securing personal articles 10 in an embodiment of the invention. The system 10 includes a lockable enclosure 12 and an image acquisition device 14 arrange to selectively capture an image of an interior of the lockable enclosure 12. The captured image is transferred to and stored in a storage element 16 that is either disposed locally with respect to the lockable enclosure 12 and the image acquisition device 14, as shown in FIG. 1, or is disposed remotely and is accessible via a network 18, as shown in FIG. 2. In the arrangement of FIG. 2, the storage element 16 is disposed within a remote computing host. Both of the arrangements of FIG. 1 and FIG. 2 include a controller 20 and a data transmission element 22. The controller 20 is configured to control operation of the image acquisition device 14 and the data transmission element 22 is arranged to facilitate communication between the elements of the system 10 and the network 18. The controller 20 may also be configured to conduct operation of the lockable enclosure 12 including access verification, locking and unlocking, etc. The network 18 may be a local area network, for example within a hotel or other facility in which the system is housed. Alternatively, the network 18 may be the internet. The system 10 further includes a server 19 that is accessible to the controller 20 via the network 18. In some embodiments, the server 19 may provide the role of the storage element 16, in other embodiments these items may be distinct. As will be discussed in further detail herein, the system 10 may be further utilized to generate a log file containing image and access attempt information with regard to the lockable enclosure 12. As also discussed in greater detail herein, this safe "audit trail" can be saved in the storage element 16 or in the server 19 after having been transmitted over the network 18 to the server.

In one example, the lockable enclosure 12 comprises a safe as illustrated in FIGS. 3A-D. Here, the safe 12 includes an enclosure 30 having an opening at a front side that is securely closed by way of a door 32. The door 32 has an input device such as a key pad 34 by which a user may input a unique personal code in order to lock and unlock the safe 12. The door further includes a display 35 for presenting information to the user, such as a locking status. While the present disclosure herein describes the safe 12 as being operable via this type of key pad/PIN arrangement, this shall not be limiting in any manner as the broad scope of the invention contemplates other access arrangements such as biometrics, near field communications (NFC), radio frequency identification (RFID) systems, magnetic strip arrangements, etc. Also, the lockable enclosure 12 is described herein as a safe, and more particularly, a safe which may be found in a multi-unit accommodation dwelling such as a hotel. This description is merely illustrative. The invention contemplates all forms of lockable enclosures which may be used for temporary or even long term storage such as for example: lockers used in educational facilities, fitness establishments, amusement parks, public transportation facilities, libraries, stadiums, museums, ski resorts, water parks, and other recreational facilities; safe deposit boxes in banks and other institutions; post office boxes; shipping lockers; etc. The safe 12 is described herein in the context of a hotel. But of course this is exemplary as well. The invention contemplates such safes disposed in various environments, for example, on cruise ships, hospitals, dormitories, military barracks, etc.

Figure 3A:
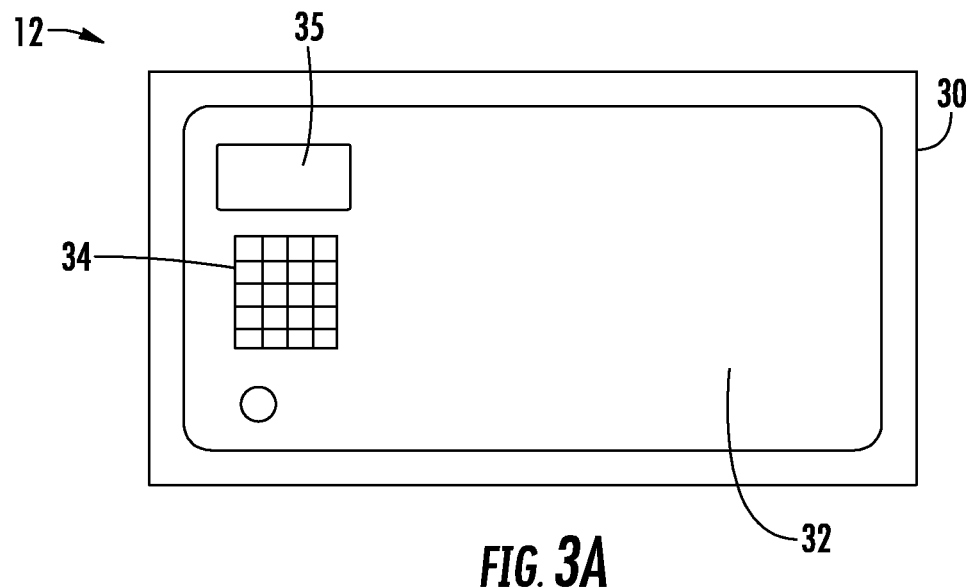
FIG. 3A-D are various views of a lockable enclosure in one embodiment of the invention.
Figure 3B:
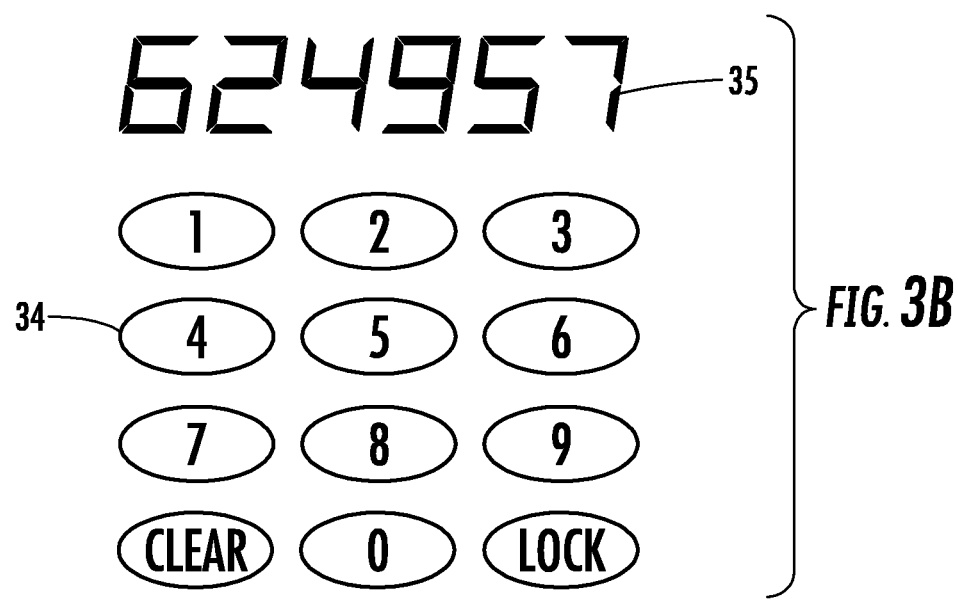
Figure 3C:
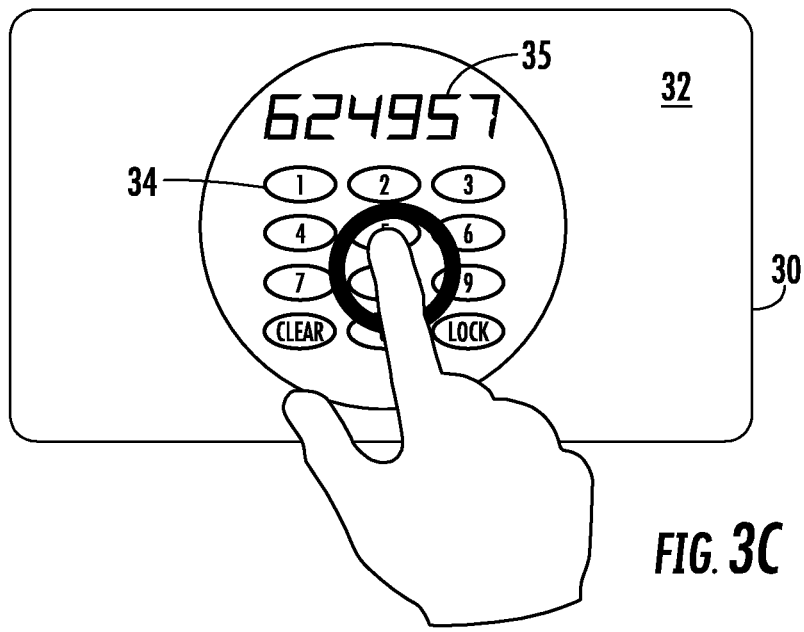
Figure 3D:
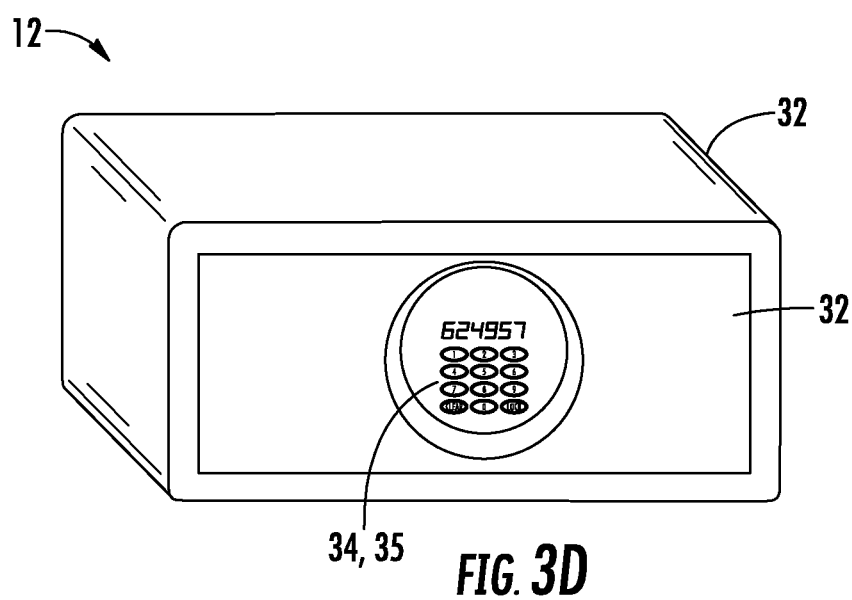

FIG. 3B shows an enlarged exemplary embodiment of the key pad 34 and display 35. FIG. 3C shows a partial enlarged front view of the safe 12 with the key pad 34 and display 35 being addressed by the hand of a user. FIG. 3D shows another exemplary embodiment of the safe 12 in which the key pad 34 and display 35 are centrally disposed on the door 32.

Figure 4:
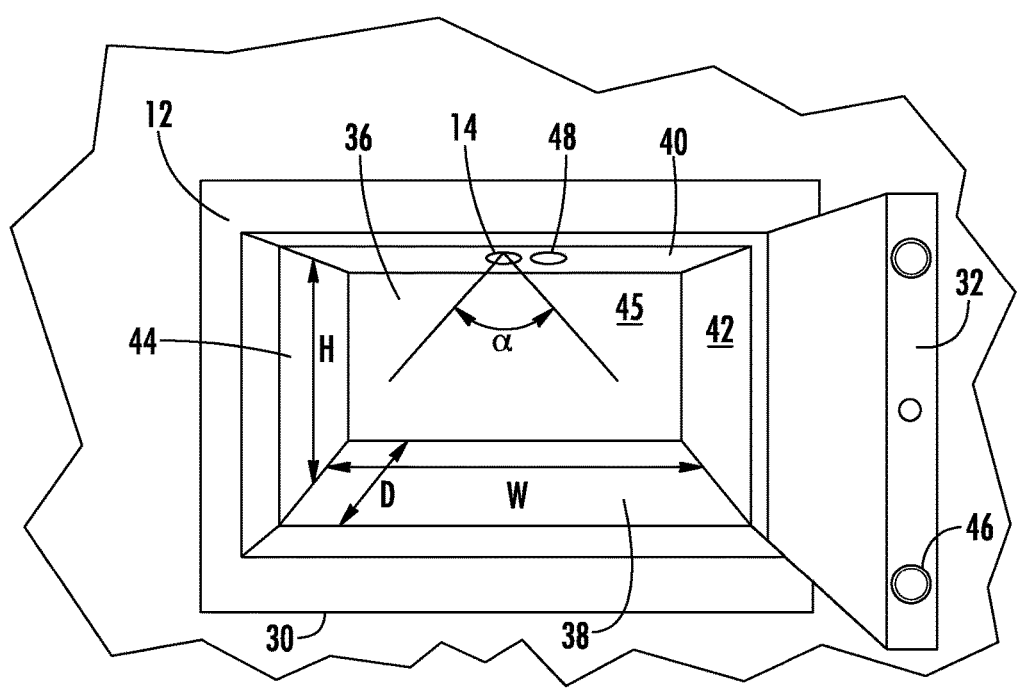
FIG. 4 is a front view thereof with the lockable enclosure in an opened condition.

FIG. 4 shows the safe 12 in an unlocked condition with the door 32 opened to reveal an interior 36 of the safe 12 which is defined by a bottom surface 38, a top surface 40, a right side wall 42, a left side wall 44, and a rear wall 45. A latch arrangement 46 can be seen in the door 32 which extends and retracts at the command of the controller 20 in order to lock and unlock the door 32, respectively. The interior 36 of the safe 12 has a width W, a height H, and a depth D. Typically, although not exclusively, W>D>H.

In the embodiment of FIG. 4, the safe 12 includes the image acquisition device 14, in the form of a camera, disposed at the top surface 40. The camera 14 may be any camera device, digital or otherwise, sufficient to capture images of the interior of the safe 12. For example, the camera 14 may utilize an OV9656 Color CMOS SXGA 1.3 MPixel camera chip by OMNIVISION. The camera 14 is positioned generally centrally in the top surface 40 of the interior 36 of the safe 12. The camera 14 is directed downwardly so as to capture images of items placed upon the bottom surface 38 of the safe interior 36. An illumination source 48 is disposed in proximity of the camera 14 and is directed toward the bottom surface 38 of the safe interior 36 and is configured to selectively project light thereto in order to illuminate an object there disposed at a time of image acquisition. The illumination source 48 may be, for example, an arrangement of light-emitting diodes (LEDs). The camera 14 has an intrinsic viewing angle $\alpha$ that is sufficiently wide to capture an object placed anywhere on the bottom surface 36. That is, the viewing angle $\alpha$ is at least sufficiently large to encompass W×D. More specifically:

$$\alpha = 2 \times \tan^{-1}\left(\frac{\sqrt{d^2 + w^2}}{2h}\right)$$

For example, a safe 12 with interior dimensions W=44, D=30, H=19, would require a camera that has a full view angle of about 109 degrees.

Figure 5:
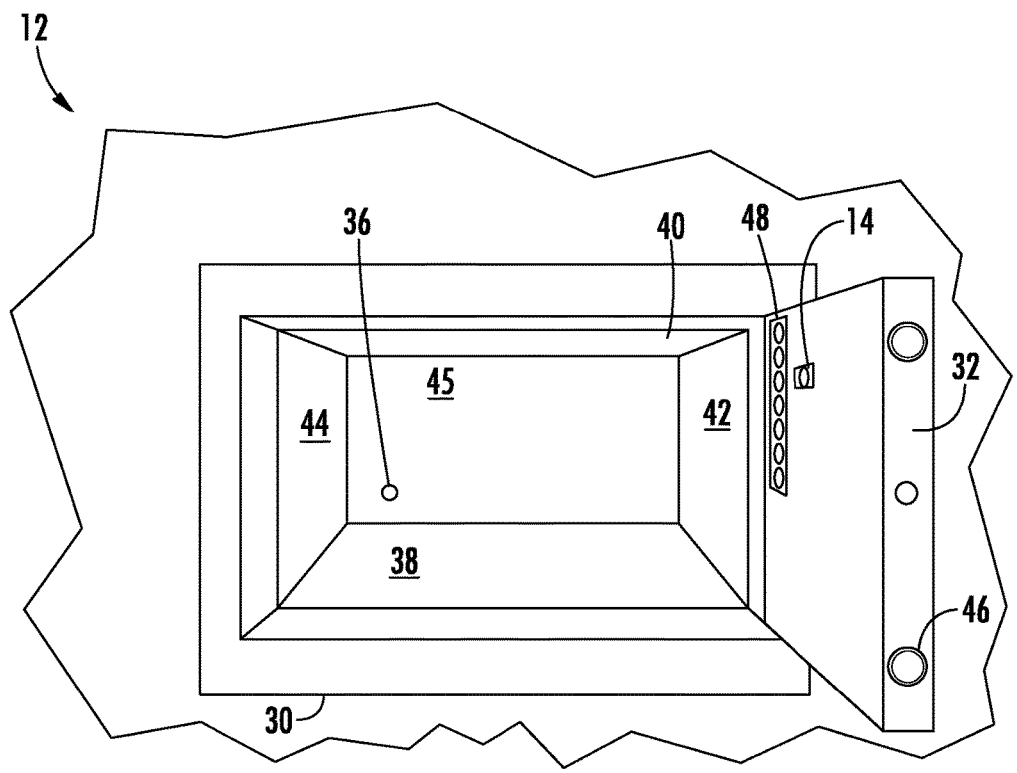
FIG. 5 is a front view of another embodiment thereof.

In FIG. 5, the safe 12 is shown in another embodiment in which the camera 14 and the illumination source 48 are located in the door 32. This disposition is particularly convenient because all of the electronics of the safe 12 along with the power source are disposed within the door 32. That is, the door 32 contains the latching mechanism 46, the keypad 34, and the display 35. For reasons of economy, once these elements are placed in the door 32, from a standpoint of economy and reliability, it makes sense to dispose all other electrical and electronic elements, such as the controller 20, the storage element 16, the data transmission element 22, and the power source, into the door as well. This avoids having to introduce a cumbersome wiring harnesses that interconnects the door with the body of the safe and which typically needs to be routed through the hinge section of the safe. For this stated reason, it is advantageous to also place the camera 14 and the illumination source 48 in the door 32 as shown in FIG. 5. In this exemplary embodiment, the camera 14 is disposed at an upper region of the door 32 along a center line C thereof. The illumination source 48 comprises a strip of LEDs arranged in the upper region and proximate to a hinge of the door. These locations of the camera 14 and LEDs 48 are merely exemplary. These elements may be located at other positions within the door 32 as desired.

Figure 6:
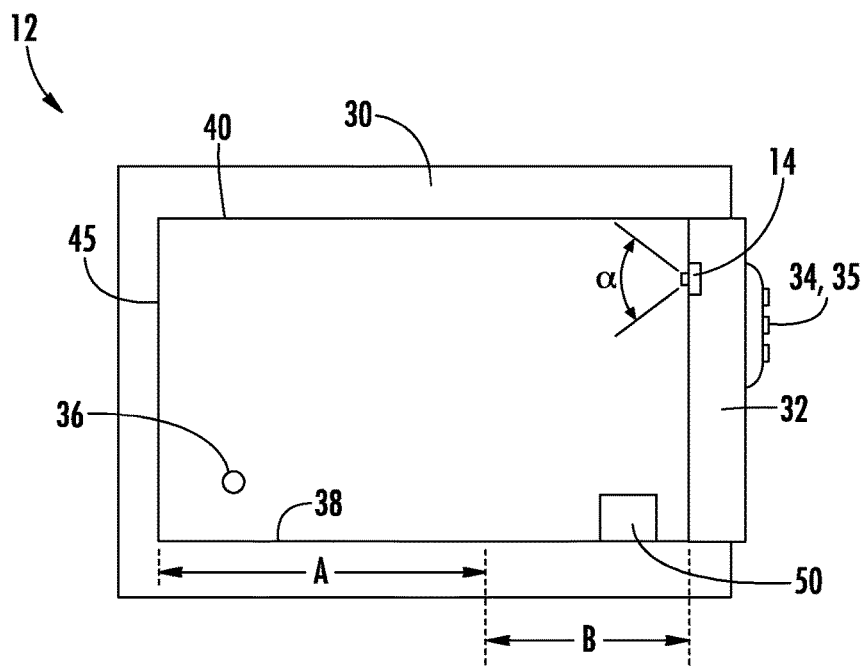
FIG. 6 is a side cross-sectional view thereof with the lockable enclosure in a closed configuration.

FIG. 6 shows a cross-sectional view of the safe 12 of FIG. 5 in a closed and locked configuration. When the door 32 is in the closed position, as illustrated, the camera 14 is able to take images of the interior 36 of the safe 12. As discussed previously, the camera 14 has a viewing angle ∝ that is determined by a focal length and other optical properties of the camera 14. If the camera 14 is strictly forward facing, that is, arranged perpendicular to the door 32, and ∝ is less than 180 degrees, then an area of the bottom surface 38 of the interior 36 of the safe 14 is delimited which is outside of the viewing angle ∝. That is, when the camera 14 is oriented in this manner, an area A of the bottom surface 38 lies within the viewing angle ∝ while an area B is outside of the viewing angle ∝. Accordingly, an object 50 placed within the area B of the bottom surface would not be visible to the camera 14. The object 50 is in the blind spot of the camera 14. To overcome the problem of blind spots, two solutions are introduced.

Figure 7:
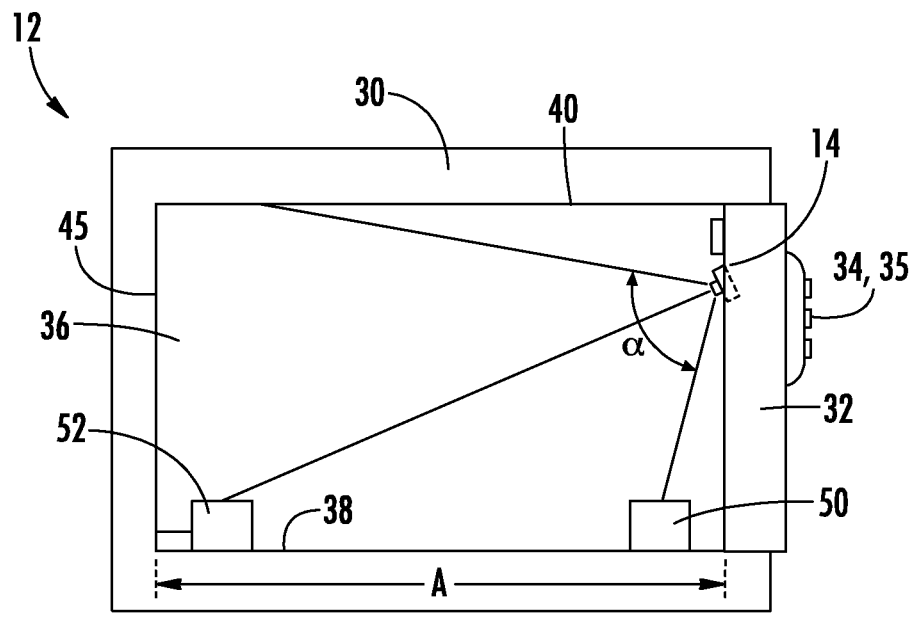
FIG. 7 is a side cross-sectional view of another embodiment thereof.

FIG. 7 shows a side cross-sectional view of another embodiment of the safe 12 in which the camera 14 is angled downwardly at a tilt angle β. This tilt angle is calculated as according to the following formula.

Tilt angle β=(180 degrees−Angle of view ∝)/2

When the tilt angle β is employed, the entire bottom surface 38 of the interior 36 of the safe 12 falls within the viewing angle ∝. That is, the viewable area A extends across the entire bottom surface 38 of the interior 36 of the safe 12. Meanwhile, area B which lies outside of the viewing angle ∝ does not exist in this embodiment. Accordingly, both the object 50 placed near the door 32 and an object 52 oppositely placed near a rear wall 45 of the interior 36 are within the viewing angle ∝ and thus can be observed by the camera 14. For this to hold, the viewing angle ∝ must be sufficiently large else the camera 14 would not be able to observe the far-end of the safe, that is the area near the rear wall 45 of the interior 36. For this reason, the camera 14 is disposed in the upper region of the door 32 as mentioned previously. This disposition of the camera 14 provides the additional benefit that the object 50 placed close to the door is relatively similar in terms of image pixel-dimensions as the object 52 placed at the opposite end of the safe. The reason is that the ratio of distances between objects 50 and 52 and the camera lens, respectively, is a number close to 1.0.

Figure 8:
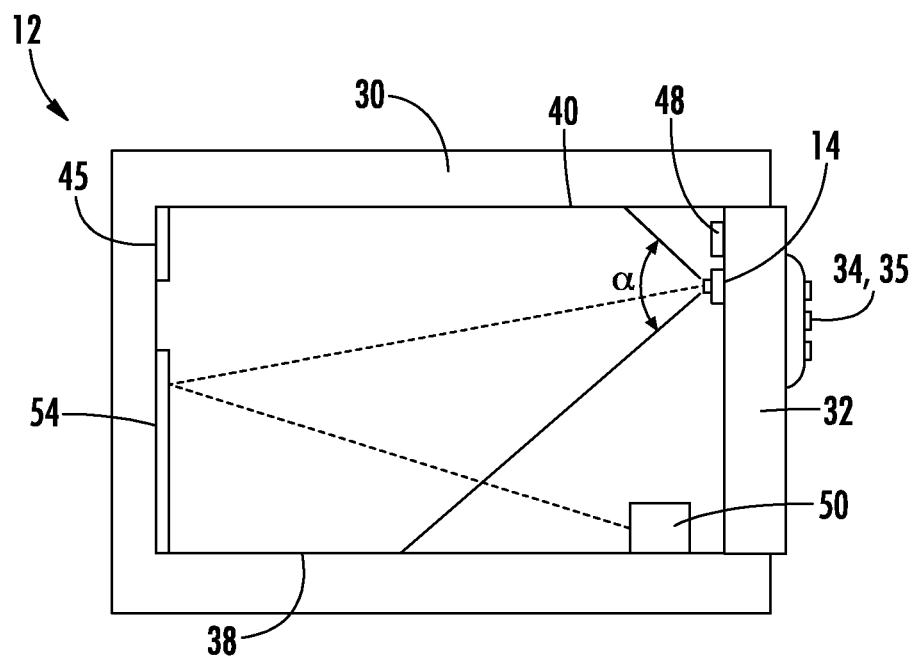
FIG. 8. is a side cross-sectional view of another embodiment thereof.

An alternate embodiment to overcome the blind spot problem is presented in FIG. 8. Therein, the camera 14 is placed principally forward looking, that is, the camera is oriented perpendicular to the door 32 and parallel with the bottom surface 38 of the interior 36 of the safe 12. To detect the object 50 in the blind spot area B, a mirror 54 is affixed to the rear wall 45 within the viewing angle ∝. In such an implementation, the object 50 that is placed in the blind spot area B of the camera 14 will become visible as a reflected image in the mirror 54. A further advantage of this configuration is that the mirror 54 will reflect the light of the illumination source 48 which will improve the overall illumination of the interior 36 of the safe 12.

Figure 9:
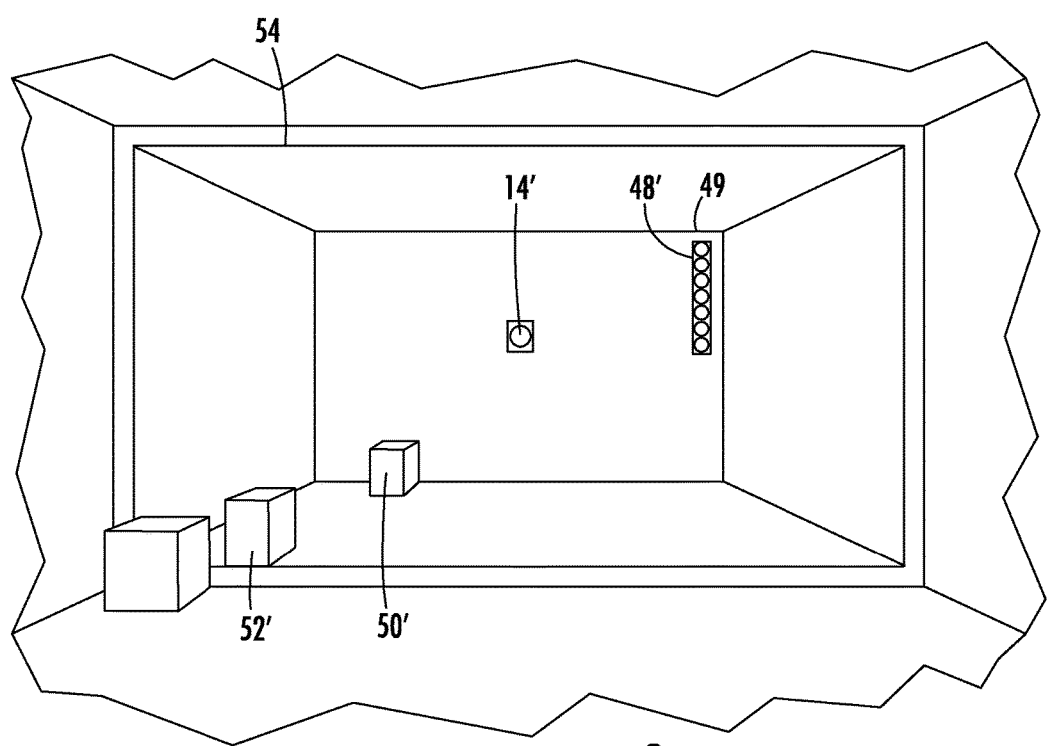
FIG. 9. is a representative view of a reflected image provided by a mirror disposed within the lockable enclosure of FIG. 8.

FIG. 9 provides a representation of an image of the interior 36 of the safe 12 as reflected by the mirror 54. That is, this illustration provides an indication of how the camera 14 would "see" the interior 36 of the safe 14 when the mirror 54 is placed at the rear wall 45. The camera 14 would see an object 52 that is directly within the viewing angle ∝. The camera 14 may also capture an image 52' of the object 52 reflected by the mirror 54, unless this image 52' is blocked by the object 52 itself. The object 50 that is disposed in the blind spot area B of the bottom surface 38 of the interior 36 of the safe 12 will be detected through its reflection 50' in the mirror 54. Additionally, if not blocked by objects in the safe 14, the image captured by the camera 14 would also contain a reflected image 48' of the illumination source 48 and a reflected image 14' of the camera 14 itself. The described setup makes it possible to visually inspect the content of the safe and, in particular, it is quite easy for a user of the system 10 to differentiate an empty safe from a non-empty safe.

A particular image capture challenge arises when an image sensor of the camera 14 receives a direct reflection 48' of the illumination source 48. An automatic aperture of a lens of the camera 14 will be biased by the strong light signal that hits the image sensor. This will yield dark images with little contrast which can result in difficulties in analyzing the captured image. To avoid the illumination source 48 essentially blinding the camera 14 in this manner, a light absorbing material 49 is applied at the location on the mirror 54 where the reflection 48' would be visible to the camera 14. This light absorbing material 49 could be for example a sticker disposed on the mirror 54 or the mirror 54 could be silkscreened or altered in any other manner to create a light absorbing effect. The color of the light absorbing section 49 can vary. More important is that the section 49 is a highly diffusing reflective surface or has a surface property that does not reflect light but absorbs light instead.

Another method to address the blind spot problem described above, is to dispose multiple cameras 14 within the interior 36 of the safe 12. Such multiple cameras 14 could be disposed in various locations within the interior 36, e.g., on the door 32 and or on other surfaces 38, 40, 42, 44, 45 of the interior 36, and could be angled as desired such that all areas within the interior 36 fall within the various viewing angles of said cameras 14. In such an implementation, images captured by the multiple cameras 14 would be aggregated into a composite image that covers the entire interior safe volume.

Referring back to FIG. 1 and FIG. 2, the system 10 of the invention allows for the image acquisition device 14 to capture images of the contents of the safe 12 and to transport these images to the server 19 and/or to the storage element 16 via the network 18. Accordingly, with the system 10, it is possible from a remote location to review the content of a locked safe in an unrented room. This is particularly advantageous in situations in which a safe is left in the locked configuration after the rental period has expired and the guest has left the premises. In such situation, a housekeeper may discover the locked safe while cleaning the room and then report the locked safe condition to security. With the invention, the security staff member receiving the call can log into the system 10 and request a current image of the safe. If the image shows that the safe is empty, the security staff member can send an unlock command through the network to place the safe into the unlocked configuration. This operational sequence can be logged in a database of the system 10. To assure that a corresponding log file cannot be tampered with, the information is tagged with sequence numbers and message authentication codes.

Notably, the system 10 allows for a safe to be unlocked remotely. That is, a user of the system 10 may send an unlock command from a remote location through the network which is then received and executed by the controller 20. Similarly, a lock command may be sent from a remote location to the controller 20 in response to which the controller 20 would effect a locking of the safe. This locking event could entail simply maneuvering the latching assembly 46 into the locked position. The locking event may further involve maneuvering the door 32 into the closed position prior to actuating the latching assembly 46. The door could be moved in this manner by one or more actuators disposed in the door 32, hinge, and/or the safe body 30 and powered by the batteries and/or by line power.

In the present example, where the captured image shows that the safe is not empty, staff members still need to facilitate the opening of the safe and retrieval of the contents left therein. A first approach might be to contact the previous hotel guest and request that he/she personally return to the property to open the safe and retrieve its contents. Hotel staff may contact the previous guest via telephone, email, or SMS. Alternatively, such notification can be provided to the previous guest automatically, without any human intervention. For example, if the guest carries a mobile device that runs an application supported by the property, as the guest checks-out from the property, the status of the safe can be consulted and if still locked, the notification can be transmitted to the guest's mobile device instantly. If contact is successful, the guest can return to the property, enter the personal PIN code, and retrieve the forgotten items from the safe. However, if a guest cannot be reasonably summoned back the location of the safe, then staff members have to retrieve the content of the safe so that the safe is made available for the next guest. With the system 10 of the invention, an image of the objects stored in the safe can be captured before the safe is opened. Also, as further discussed below, an access log can be generated which includes details of access attempts and images of the interior of the safe. This information generated by the system 10 provides clear evidence of the contents of the safe and the access history of the safe which can be particularly helpful in resolving any conflict regarding what was left behind in the safe.

Figure 10:
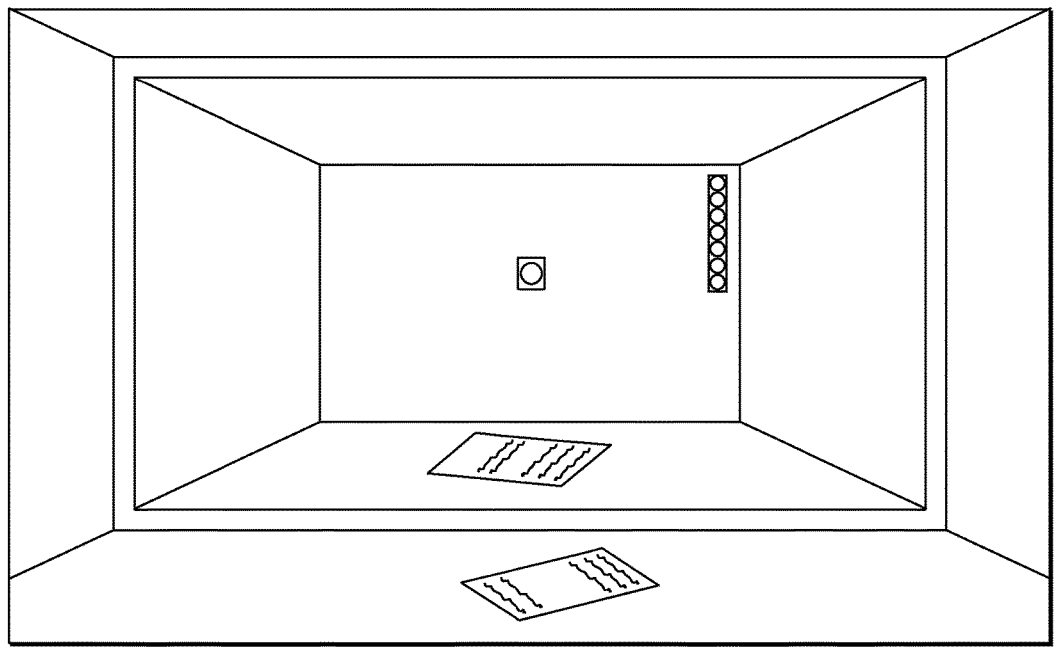
FIG. 10 is an exemplary log file of a lockable enclosure provided by the system of the invention.

FIG. 10 provides an example of a log file as referenced above. It portrays a situation in which a guest has departed the facility with the safe in the locked condition and the guest is unavailable or otherwise unable to return to the facility to personally unlock the safe. The data on line 1 of the log file indicates that a staff member of the hotel connected a handheld override tool in order to unlock the safe. Lines 2-3 indicate that the staff member entered their override code and requested that the safe be unlocked. Line 4 of the log file indicates that an image of the interior of the safe was captured. Then and only then, at line 5, the safe is unlocked. That is, the image capture precedes the unlocking of the safe. Lastly, at line 6, the handheld device is disconnected and, presumably, the contents left in the safe are retrieved. The staff member's logon procedure, request for the image, the image itself and the unlock operation are all sequentially logged and can serve as a supporting data in case a review of the opening procedure is required.

Figure 11A:
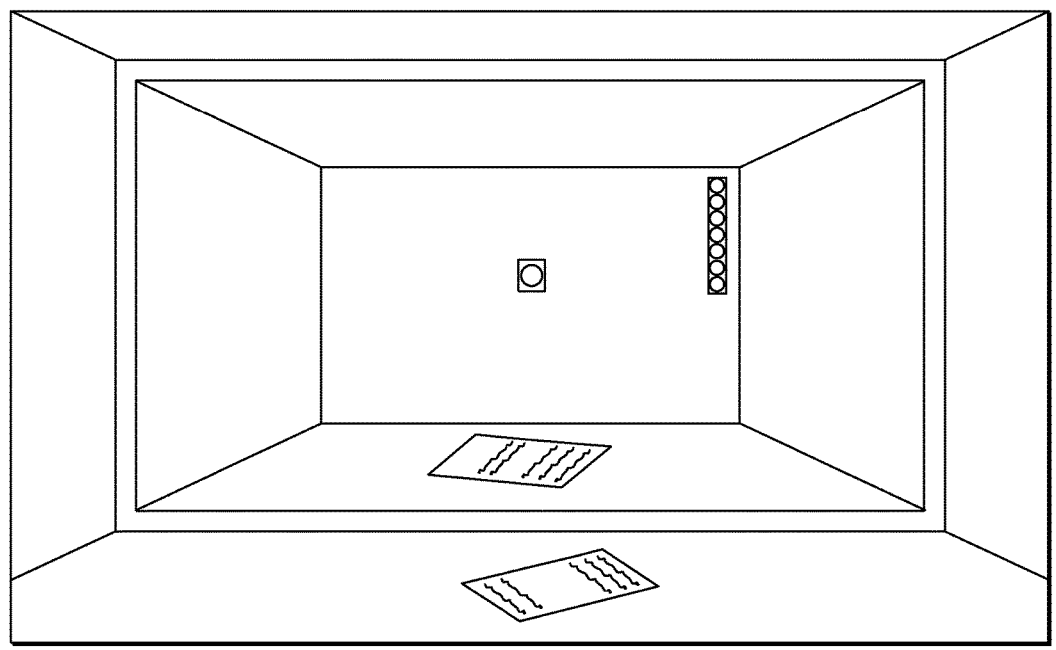
FIG. 11A is another exemplary log file of a lockable enclosure provided by the system of the invention.

FIG. 11A shows an example of an audit trail that might help resolve a guest claim. In the provided example, a guest locks the safe as indicated at line 1 of the log file. The safe shortly thereafter takes an image of the safe's content (line 2). The image shows that the guest has put an object resembling a passport into the safe. Two days later the guest opens the safe to obtain his valuables to depart the hotel. He is under the impression that he placed his gold watch and his passport into the safe but to his surprise, he only finds the passport. He now contacts the hotel with a theft complaint. A staff member is deployed to the room to generate the audit trail. The audit trail not only documents that there have been no other access attempts between the guest's locking and unlocking operations, but also, by virtue of the image acquisition procedure, indicates that a watch was never placed into the safe. At this point, the staff member may conclude that the guest has lost his watch through other means or that the guest has attempted to defraud the hotel by making an incorrect theft claim. Assuming that the guest made the incorrect claim without mal intent, the staff member can encourage the guest to search for the watch at all other possible locations without concern that it was stolen from the safe.

Figure 11B:
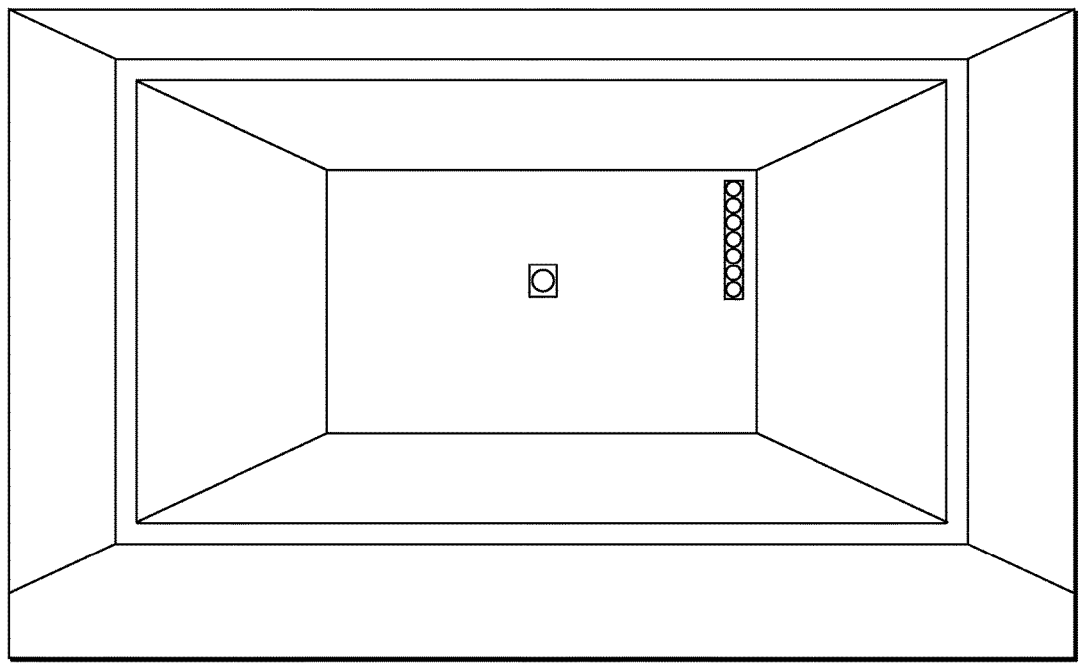
FIG. 11B is another exemplary log file of a lockable enclosure provided by the system of the invention.

FIG. 11B shows another example of an audit trail produced by the system 10 of the invention. Here, at line 1, the log file indicates that the guest has locked the safe. Later, the guest checks out of the hotel and leaves the premises with the safe in the locked condition. Some time later, this is discovered by the hotel staff. Lines 2-3 of the log file indicates that an image is captured of the interior of the safe and is transmitted to the server. By one of the various mechanisms discussed above, a hotel staff member accesses the image and can see, as illustrated in FIG. 11B, that the safe is empty. Accordingly, at line 4, the staff member sends a remote unlock command which opens the safe, thus placing it in a usable condition for the next guest.

Placing cameras into networked safes, as in the system 10, can raise security, confidentiality, and privacy concerns. For example, if a person inclined to thievery had access to images of the interior of all of the safes at a particular property, this would aid such person in targeting for theft those safes containing the highest value objects. To avoid this problem, the system 10 is configured to not store or make available images of safes that are associated with rented rooms where a guest is still using the safe normally. That is, where a room is rented and the safe is in use, images of its interior are kept inaccessible.

A further issue arises with storing images that might contain confidential information. Guests might leave confidential papers, product prototypes or other sensitive matters in the safe. For that reason, again the system will not make available images of safes that are in use by guests while they rent the room.

Providing images of locked safes in unrented rooms is of a lesser concern because in cases when staff members need to retrieve the objects, they are confronted with the nature of the safe's content regardless and the image does not materially add to the loss of privacy on the content.

The controller 20 carefully guards image acquisition and employs a condition filter algorithm to permit access only under certain predetermined conditions. One such condition concerns the status of the room. As noted above, when a room is unrented, the controller permits access to the corresponding images and access log. When rented, the controller denies access. Another predetermined condition upon which image access is predicated is an override attempt by a facility staff member. Here, regardless of whether the particular room is rented or unrented, images of the interior of the respective safe may be accessed where a staff member provides the system with acceptable override instructions.

This procedure may comprise, for example, entry of a specific override code by the staff member, entry of certain credentials or other identifying information. Another exemplary predetermined condition upon which the condition filter algorithm will grant access to safe images concerns user privilege. For example, if a staff member is identified by the system 10 as management or security or having some other acceptable privileged status, the system 10 would grant access to captured images. Other conventional means of limiting access to image data are contemplated and employed by the broad scope of the invention and the foregoing is merely illustrative.

The system 10 is further configured to address privacy concerns with respect to a camera being located inside an in-room safe. It is critical to assure that the camera does not take images which may show hotel guests or other aspects of the exterior environment of the safe. To achieve this, the camera operation is coordinated with the operation of the door of the safe. Only when the door is closed is the camera allowed to take an image. This accomplished by disposing a door sensor in the safe. The sensor is connected to the controller which is configured to launch a sub-system of the camera that takes images of the interior of the safe. The sensor detects when the door is closed and sends a corresponding message to the controller which then activates the sub-system and enables the camera to take pictures. Similarly, the sensor detects when the door is open and sends a corresponding signal to the controller which disables the image acquisition capability of the camera.

The images of the interior content of the safe are not needed for the operation of the system 10. This provides the opportunity to conserve the power consumed by the safe 12. If the safe 12 is battery powered, transporting an image over a network will require a certain amount of power to do so. For example, where the safe is equipped with a ZigBee network, an image that might be 80 kBytes in size might have to be split into 1000 packets transporting each 80 bytes of the image. Reliably transporting 1000 packets requires a significant amount of energy and would require that either the batteries be much stronger than usual or that they be replaced much more frequently. By selectively only transporting images of locked safes in unrented rooms, power consumption is greatly reduced. Further, the network bandwidth required to transport image data to a server may be correspondingly reduced.

In an alternate embodiment, the system 10 is configured to take pictures of the interior of locked safes in rented rooms, but the image data is stored in memory that is located in the safe itself. See, e.g., FIG. 1. That is, here the storage element 16 forms a part of the safe and transmission of image data to the network 18 is not automatically required. In this embodiment, the safe 12 would contain an SPI-Flash memory or similar to store the images. In this embodiment, content images could be made available as part of a safe audit log when pulled with a handheld unit at the safe itself. Alternatively, the local storage of image data could be accessed remotely via the network 18. But during typical use, images and access data would be stored locally and thus the safe batteries would not be burdened with unnecessarily powering data transmission.

Figure 12:
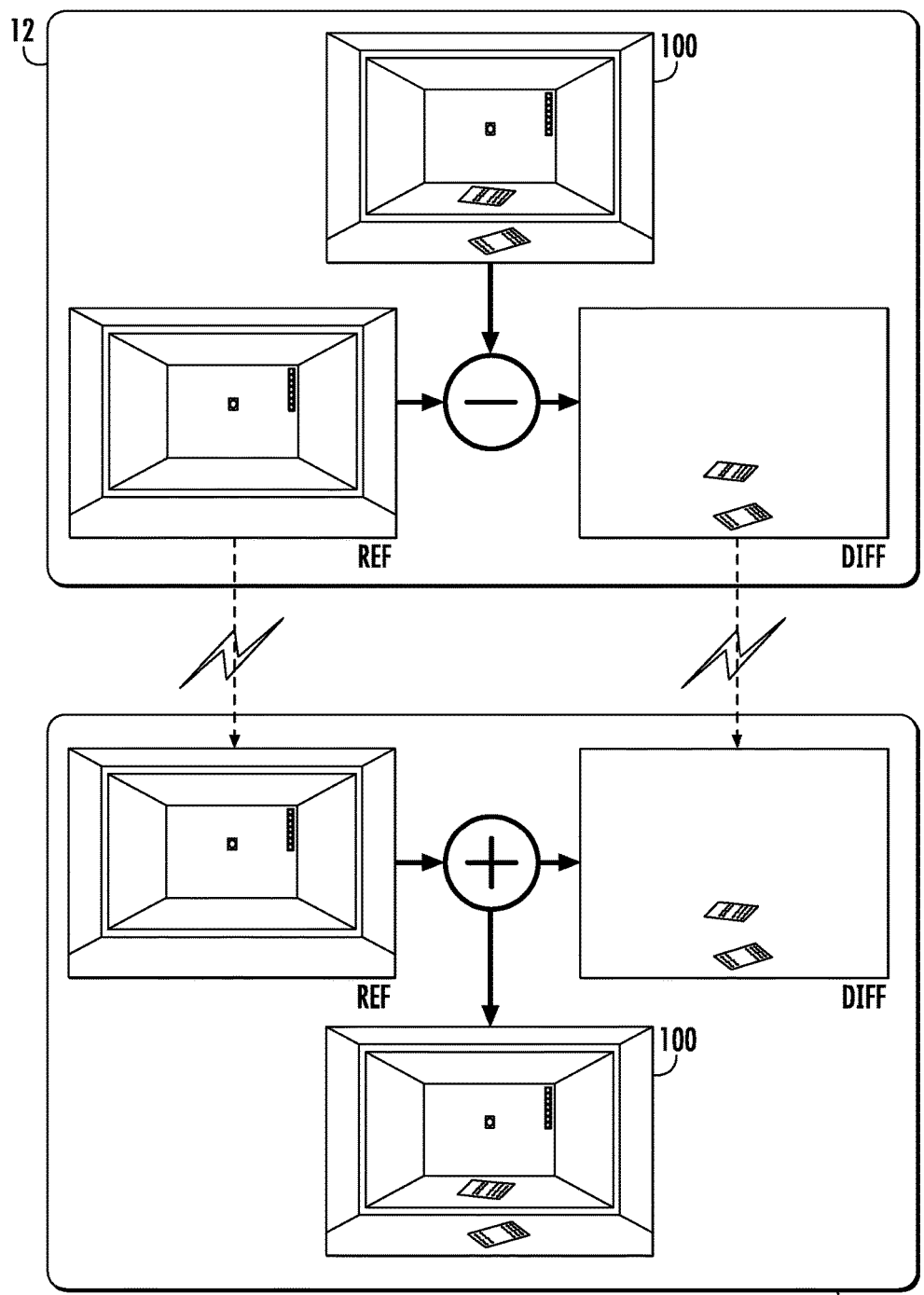
FIG. 12 is a schematic representation of a data reduction process employed by an embodiment of the invention.

FIG. 12 shows a means to further improve network bandwidth utilization that also reduces battery consumption and hence conserves energy of the system. Here, the images are encoded as differential images. The camera 14 of the system 10 captures a first image, Ref, of the safe in an empty condition. The image Ref is stored in a non-volatile memory of the safe 12 as a reference image. This image Ref is also sent, but just once, over the network 18 to the server 19. The server 19 stores the image Ref in its non-volatile memory as well, such as in its hard disk or database.

When the safe 12 is called upon to provide a picture of its interior, an image 100 is captured showing the interior of the safe and any contents. In the illustrated example, image 100 shows a passport that has been put into the safe, the interior of the safe compartment, and a reflection of the passport in a mirror located within the safe. Using appropriate software, the earlier image Ref is subtracted from the image 100 in order to obtain a differential image Diff. This image contains much less information than the image 100 as it only shows the differences between the image Ref and the image 100. Due to the reduced amount of information contained in Diff, the image can be compressed much more effectively. The image Diff is then sent over the network 18 to the server 19 in a data reduced efficient manner. The server 19 in turn adds its stored Ref image to the newly arrived Diff image in order to reconstitute the original image 100 taken by the safe. As the image Ref needs to be sent only once over the network and the image Diff is reduced in data size, an ongoing bandwidth and energy reduction benefit accrues in sending all future images from the safe to the server.

Herein, the image acquisition device 14 is described in a non-limiting embodiment as a camera which is configured to selectively capture an image of an interior 36 of a safe 12. In another exemplary embodiment of the invention, the image acquisition device 14 may comprise a sensor configured to simply detect the presence and/or absence of an object within the interior 36 of the safe 12. For example, a laser arrangement could be utilized in which one or more laser emitters are disposed within the interior 36 of the safe 12 and corresponding laser detectors are disposed within the interior 36 opposite from the emitters. When the safe 12 is empty, the detectors continually or periodically receive and detect the emitted lasers. When an object is placed within the interior 36, the emitted laser beam is obstructed and not received at the detector in whole or in part. The detectors would be disposed in signal communication with the storage element 16, the controller 20 and data transceiver element 22, such that the status of the laser beam at the detector could be communicated by the laser arrangement to the controller 20 and then onward to the network 18 in the manner discussed above. For example, the system may be configured such that upon an access attempt by the room guest or by a staff member, the status of the laser at the detectors is saved at the storage element 16 and/or transmitted to the network 18 and perhaps to the server 19. If the laser is received at the detector, the system can conclude that the safe 12 is empty. Conversely, if the laser is not received at the detector, then the system can conclude that an object is present within the safe 12. Upon completion of the transmission of this data, the safe 12 would be unlocked so long as the access attempt was accurate and successful. The data concerning the access attempt would be transferred across the system as discussed above and made available to the hotel staff as also discussed above. This would allow creation of a log file which included details of the access attempt and information regarding whether an object was present in the interior 36 of the safe 12 at the time of the access attempt. Other means and methods of detecting the presence of an object within the safe, without capturing a specific photographic image thereof, could be utilized with the system of the invention. That is, the discussed laser arrangement is merely exemplary. Weight sensors could be employed in the bottom surface 38 of the safe to detect an object placed thereupon. Other object detection technologies may be utilized such as for example proximity sensors, ultrasonic sensors, or sensors employing one or more of the following technologies: capacitive, photoelectric, inductive, magnetic, infrared, sonar, radar and acoustic.

The lockable enclosure 12 is described herein by way of example as a safe 12 having an enclosure 30 that defines an interior space 36 in which personal articles can be secured. The secure interior 36 is accessed via a door 32 shown in FIG. 4 as being mounted on the front vertical face of the safe 12. Such safe 12 may be fixably disposed within a closet or elsewhere within a hotel room. This arrangement is of course merely exemplary. The safe 12 may be disposed in a wall of a room. The safe may be of the top-open variety with an access door disposed on a top surface of the safe. The safe may be a drawer safe which is installed within furniture. Alternatively, as mentioned above, the lockable enclosure 12 may be a locker, or the like, at a water park, a fitness facility, a train station, etc.

As used herein, the term "controller" refers to an application specific integrated circuit (ASIC), an electronic circuit, a microprocessor, a computer processor (shared, dedicated, or group) and memory that executes one or more software or firmware programs, a combinational logic circuit, a microcontroller including various inputs and outputs, and/or other suitable components that provide the described functionality. The module is configured to execute various algorithms, transforms, and/or logical processes to generate one or more signals of controlling a component or system. When implemented in software, a module can be embodied in memory as a non-transitory machine-readable storage medium readable by a processing circuit (e.g., a microprocessor) and storing instructions for execution by the processing circuit for performing a method. A controller further refers to an electronic hardware controller including a storage unit capable of storing algorithms, logic or computer executable instruction, and that contains the circuitry necessary to interpret and execute instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

The invention claimed is:

1. A system for securing personal articles, comprising:
   a lockable enclosure;
   an image acquisition device disposed to capture an image of an interior of the lockable enclosure;
   a storage element configured to store the image;
   a data transmission element configured to transfer the image to a network;
   a controller configured to grant access to the image only upon fulfillment of a predetermined condition; and
   an input device configured to send a lock command and an unlock command to the controller;
   wherein the image acquisition device, the storage element, the data transmission element, the input device, and the controller are disposed in communication with one another and with the network;
   wherein the lockable enclosure is a safe disposed within a rentable room of a multi-unit accommodation dwelling,
   wherein the predetermined condition comprises an un-rented status of the room;
   wherein the image acquisition device is configured to capture said image when said unlock command is valid; and
   wherein the lockable enclosure is configured to unlock only after said image is captured.

2. The system of claim 1, wherein the predetermined condition further comprises an override access attempt by a staff member of the multi-unit accommodation dwelling.

3. The system of claim 1, wherein the predetermined condition further comprises a privilege associated with the user attempting to access the image.

4. The system of claim 3, wherein the user privilege comprises a designation as management or security of the multi-unit accommodation dwelling.

5. The system of claim 1, wherein the image is automatically acquired upon a successful attempt to access the lockable enclosure and immediately preceding an unlocking of a door of the enclosure.

6. The system of claim 1, wherein the image is acquired in response to instructions transmitted to the image acquisition device through the network by a remote user.

7. The system of claim 1, wherein the safe comprises:
   a numeric or alpha-numeric keypad for locking and unlocking the safe; and
   a power source comprising at least one of a battery, a line power, and an energy harvesting source.

8. The system of claim 1, further comprising an illumination source configured to selectively illuminate the interior of the lockable enclosure.

9. The system of claim 1, wherein the lockable enclosure comprises a latch arrangement which locks the safe when engaged and which unlocks the safe when disengaged, the system further comprising a sensor configured to detect when the latch is engaged and disengaged and to communicate this status to the controller.

10. The system of claim 1, wherein the image acquisition device comprises a viewing angle within which image data may be captured, wherein the interior of the lockable enclosure includes a first area disposed within the viewing angle, and a second area disposed outside of the viewing angle, and wherein the system further comprises a reflective element disposed within the viewing angle and positioned to provide the image acquisition device with a reflected image of the second area.

11. The system of claim 10, further comprising:
   an illumination source configured to selectively illuminate the interior of the lockable enclosure; and
   wherein a direct reflection of the illumination source by the reflective element with respect to the data acquisition device is mitigated by at least one of diffusing light emissions from the illumination source, absorbing light reflected from the reflective element at an area proximate to the illumination source, and spatially separating the image acquisition device and the illumination source.

12. The system of claim 1, wherein the image acquisition device comprises a camera disposed in a ceiling of the lockable enclosure.

13. The system of claim 1, wherein the image acquisition device comprises a camera disposed at an interior side of the lockable enclosure or in a door of the lockable enclosure and wherein the camera is angled downward such that an entire bottom surface of the lockable enclosure is within a viewing angle of the camera.

14. The system of claim 1, wherein the storage element is disposed within an electronic arrangement of the lockable enclosure.

15. The system of claim 1, wherein the storage element is disposed within a remote computing host disposed in communication with the lockable enclosure via the network.

16. The system of claim 1, wherein the data image acquisition device is configured to capture still or moving images in the spectrum of visible light, infrared, or ultraviolet.

17. A method for operating a system for securing personal articles, the method comprising:
   placing a personal article within an interior of a lockable enclosure;
   using an input device disposed on the lockable enclosure to send a lock command to a controller;
   locking the lockable enclosure in response to the lock command;
   using the input device to send an unlock command to the controller;
   if the unlock command is valid, capturing an image of the interior of the lockable enclosure;
   unlocking the lockable enclosure only after said image is captured;
   securely storing the image at a storage element; and
   allowing access to the image only upon fulfillment of a predetermined condition;
   wherein the lockable enclosure is a safe disposed within a rentable room of a multi-unit accommodation dwelling, and
   wherein the predetermined condition comprises an unrented status of the room.

18. The method of claim 17, wherein predetermined condition further comprises at least one of:
   an override access attempt by a staff member of the multi-unit accommodation dwelling; and
   a user privilege of the user attempting to access the image, wherein the user privilege comprises a designation as management or security of the multi-unit accommodation dwelling.

* * * * *